(12) United States Patent
Jang et al.

(10) Patent No.: US 9,749,051 B2
(45) Date of Patent: Aug. 29, 2017

(54) CENTRAL OFFICE DEVICE, REMOTE SITE DEVICE, AND COMMUNICATION METHOD THOSEOF

(71) Applicant: Electronics and Telecommunications Research Institute, Daejeon (KR)

(72) Inventors: Seung Hyun Jang, Daejeon (KR); Bong Hyuk Park, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 36 days.

(21) Appl. No.: 14/863,862

(22) Filed: Sep. 24, 2015

(65) Prior Publication Data

US 2016/0094294 A1 Mar. 31, 2016

(30) Foreign Application Priority Data

Sep. 30, 2014 (KR) .................. 10-2014-0131765

(51) Int. Cl.
*H04B 10/25* (2013.01)
*H04B 10/2575* (2013.01)

(52) U.S. Cl.
CPC . *H04B 10/25753* (2013.01); *H04B 10/25759* (2013.01)

(58) Field of Classification Search
CPC ................................ H04B 7/024; H04B 7/026
USPC ........................................................ 375/295
See application file for complete search history.

(56) References Cited

U.S. PATENT DOCUMENTS

| 5,793,754 A * | 8/1998 | Houldsworth ....... H04B 14/026 340/870.19 |
| 6,069,722 A * | 5/2000 | Schlag ..................... H04N 7/22 348/E7.094 |
| 2004/0106435 A1 | 6/2004 | Bauman et al. |
| 2012/0106657 A1 | 5/2012 | Fischer et al. |
| 2014/0086083 A1 | 3/2014 | You |

(Continued)

FOREIGN PATENT DOCUMENTS

| JP | 2009-94572 A | 4/2009 |
| KR | 10-2005-0084176 A | 8/2005 |

(Continued)

OTHER PUBLICATIONS

Nirmalathas, Ampalavanapillai, et al., "Digitized Radio-Over-Fiber Technologies for Converged Optical Wireless Access Network." Journal of Lightwave Technology, vol. 28.16, Aug. 15, 2010: p. 2366-2375.

(Continued)

*Primary Examiner* — David S Huang
(74) *Attorney, Agent, or Firm* — NSIP Law

(57) ABSTRACT

The present invention relates to a central office device, a remote site device, and a communication method thereof that can be used in a radio over fiber (RoF) technique. Provided are a central office device and a communication method thereof that convert an analog signal into a signal having a carrier with an intermediate frequency and converts the converted signal into a digital signal to transmit the converted digital signal to a remote site device. Provided are a remote site device and a communication method thereof that filter a digital signal having a carrier with an intermediate frequency to easily induce a corresponding analog signal.

18 Claims, 14 Drawing Sheets

(56) References Cited

U.S. PATENT DOCUMENTS

| | | | |
|---|---|---|---|
| 2014/0293894 A1 | 10/2014 | Saban et al. | |
| 2014/0328434 A1* | 11/2014 | Negra | H04L 27/2053 375/308 |
| 2015/0256358 A1* | 9/2015 | Stapleton | H04W 52/245 370/329 |

FOREIGN PATENT DOCUMENTS

| | | |
|---|---|---|
| KR | 10-2013-0085521 A | 7/2013 |
| KR | 10-2014-0012948 A1 | 2/2014 |

OTHER PUBLICATIONS

Kansean, Thavamaran, et al. "Experimental Verification of Optimized LTE-RoF System for eNB Cell Radius Improvement." Photonics Technology Letters, IEEE, vol. 24.24, Dec. 15, 2012: 2210-2213.

\* cited by examiner

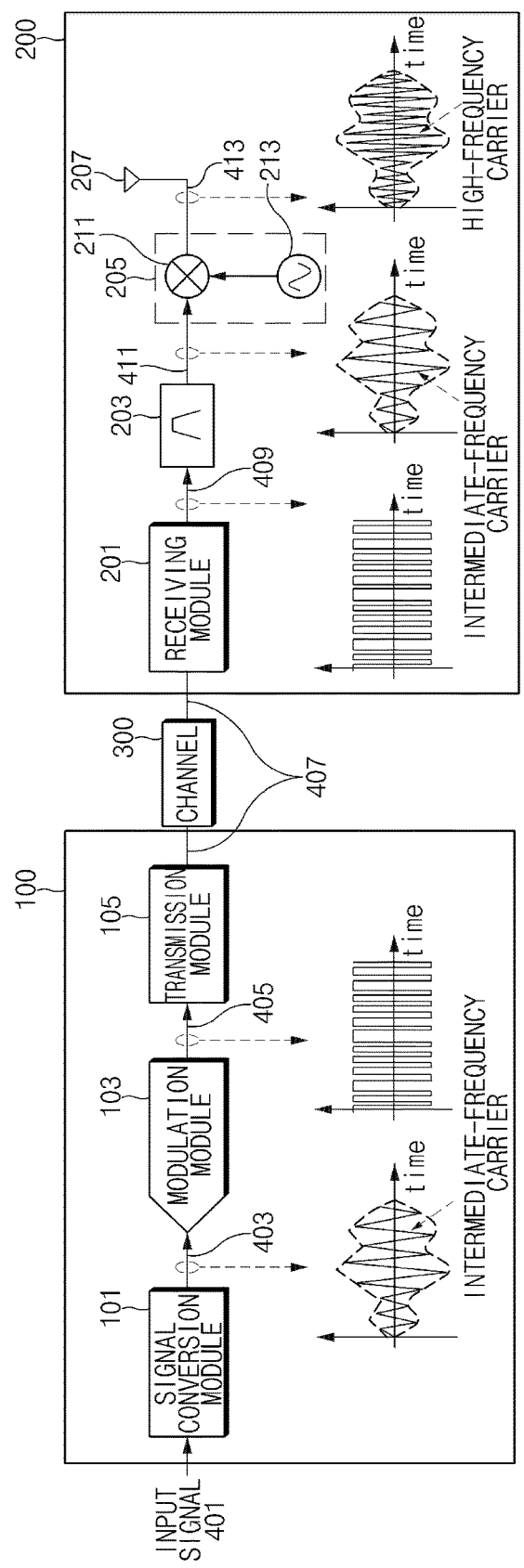

<POWER SPECTRAL DENSITY>

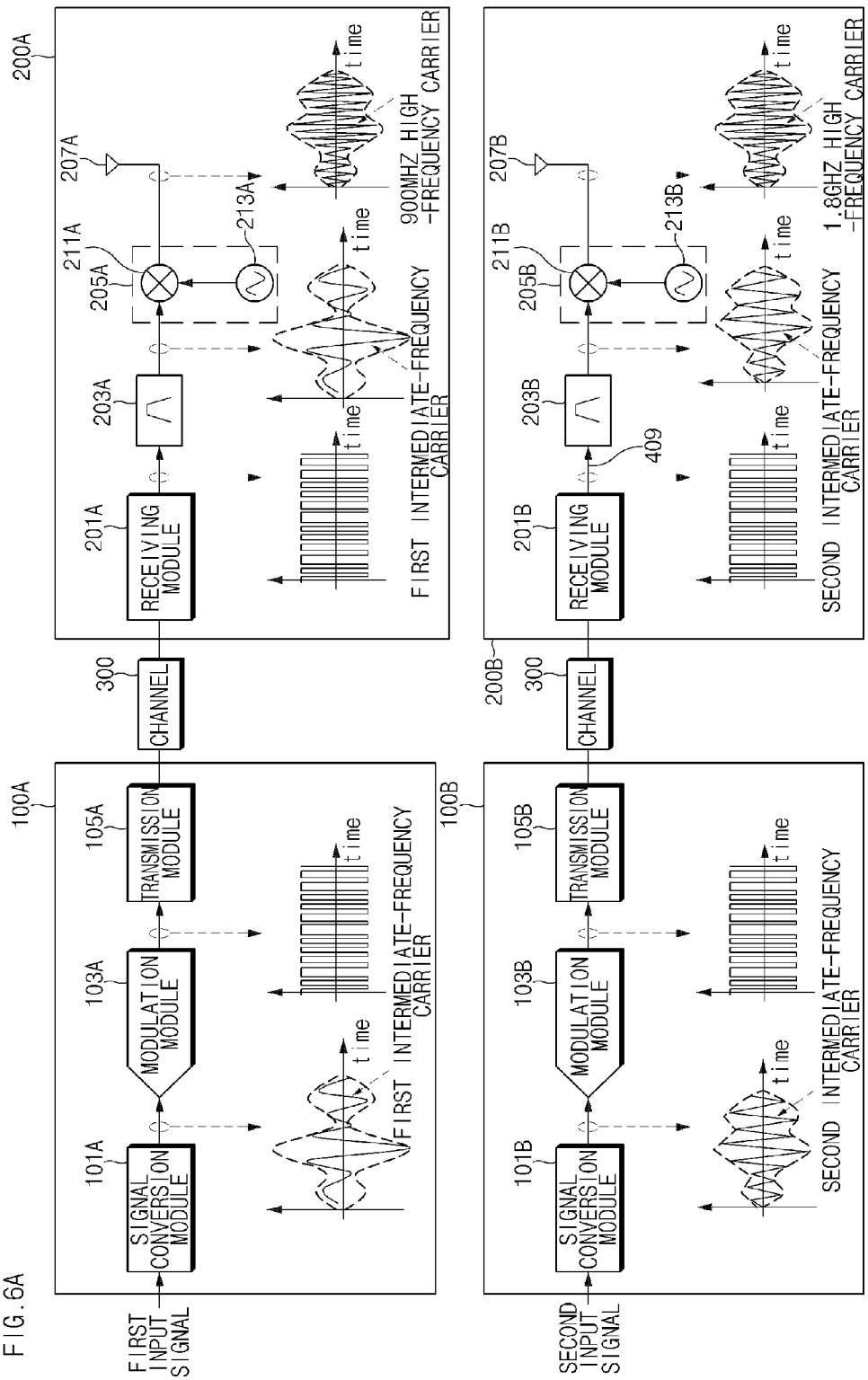

CENTRAL OFFICE DEVICE, REMOTE SITE DEVICE, AND COMMUNICATION METHOD THOSEOF

CROSS-REFERENCE TO RELATED APPLICATIONS

This application claims priority to and the benefit of Korean Patent Application No. 10-2014-0131765 filed in the Korean Intellectual Property Office on Sep. 30, 2014, the entire contents of which are incorporated herein by reference.

TECHNICAL FIELD

The present invention relates to a central office device, a remote site device, and a communication method thoseof that can be used in a radio over fiber (RoF) technique.

BACKGROUND ART

In recent years, with the worldwide explosive demand for a smart phone, a wireless data usage has rapidly increased. In particular according to a recent report (Cisco VNI 2013), 80% of radio traffic has been generated indoor. Therefore, telecommunication service providers have born a burden of continuously investing mobile communication equipment in order to efficiently meet the demand for the radio traffic indoor, which has explosively increased.

Therefore, public attentions have concentrated on a radio over fiber (RoF) interlocking ultrahigh-frequency communication with an ultrahigh-speed optical communication network, which enables a large-capacity multimedia telecommunication service by joining a wired communication technique and a wireless communication technique.

The RoF technique has a lot of advantages such as achievement of a broadband of a channel capacity, low cost, low power, easy equipment installation and operation management by using both the optical communication technique and the wireless technique. In particular, a distributed antenna system (DAS) which is one example of the RoF technique provides an appropriate solution for an ultrahigh radio multimedia service in outdoor spaces such as an underground tunnel, a narrow street, and a highway as well as indoor spaces such as an airport terminal or a shopping center and a large-sized office.

SUMMARY OF THE INVENTION

Even though the RoF technique in the related art has various advantages such as remote control, easy maintenance, and the like, the RoF technique has a crucial problem because the technique is inherently based on an analog signal. For example, systems adopting the RoF technique are more easily influenced by a change in surrounding environment than a digital signal. Further, according to the RoF technique in the related art, if the analog signal has a very high frequency of GHz, high-price RF devices are required to implement an RoF system, and as a result, there is a limit in cost saving.

The present invention has been made in an effort to provide a central office device and a communication method thereof that convert an analog signal into a signal having a carrier with an intermediate frequency (IF) and converts the converted signal into a digital signal to transmit the converted digital signal to a remote site device. The present invention has also been made in an effort to provide a remote site device and a communication method thereof that filter a digital signal having a carrier with an intermediate frequency to easily induce a corresponding analog signal.

An exemplary embodiment of the present invention provides a central office device including: a signal conversion module converting an input signal into an analog signal having a carrier with an intermediate frequency (IF); a modulation module generating a digital signal corresponding to the analog signal by applying pulse density modulation to the analog signal; and a transmission module transmitting the digital signal to a remote site device through a channel.

The modulation module may use band-pass delta sigma modulation (BPDSM) or low-pass delta sigma modulation (LPDSM) in the pulse density modulation.

The intermediate frequency may be higher than a baseband frequency and lower than a carrier frequency of a signal transmitted from the remote site device.

The input signal may be a signal having the baseband frequency.

The signal conversion module may convert a first input signal and a second input signal into analog signals having a carrier with a first intermediate frequency and a carrier with a second intermediate frequency, respectively and synthesizes the analog signals, and the modulation module may apply pulse density modulation to the synthesized analog signal to generate a digital signal corresponding to the synthesized analog signal.

The central office device may further include an electrical to optical conversion module converting the digital signal into an optical digital signal and the transmission module may transmit the optical digital signal to the remote site device.

Another exemplary embodiment of the present invention provides a remote site device including: a receiving module receiving a digital signal from a channel; a filter module passing an analog signal having a carrier with an intermediate frequency by filtering the digital signal; a frequency conversion module converting the frequency of the carrier of the analog signal into a predetermined communication frequency; and an antenna module transmitting the converted analog signal.

The filter module may be a passive filter, and a low-pass filter or a band-pass filter.

The remote site device may further include, wherein a receiving module may receive an optical digital signal, an optical/electrical conversion module converting the optical digital signal into an electrical digital signal.

The predetermined communication frequency may be a predetermined frequency between the antenna module and a terminal receiving the converted analog signal.

The filter module may further include a first filter module passing a first analog signal having a carrier with a first intermediate frequency by filtering the digital signal, and a second filter module passing a second analog signal having a carrier with a second intermediate frequency by filtering the digital signal.

The frequency conversion module may include a first frequency conversion module converting the frequency of the carrier of the first analog signal into a first communication frequency, and a second frequency conversion module converting the frequency of the carrier of the second analog signal into a second communication frequency.

According to exemplary embodiments of the present invention, since a signal transmitted through a channel is digital, more stable performance and signal quality can be achieved. Further, since a frequency is used as an intermediate frequency (IF), which is higher than a baseband frequency and lower than a carrier frequency of a signal transmitted from a remote site device, low power and low cost can be achieved.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIG. 2 illustrates a central office device and a remote site device according to an exemplary embodiment of the present invention.

FIG. 6A illustrates the central office device and the remote site device when a plurality of signal is input according to the exemplary embodiment of the present invention.

Figure 1A:
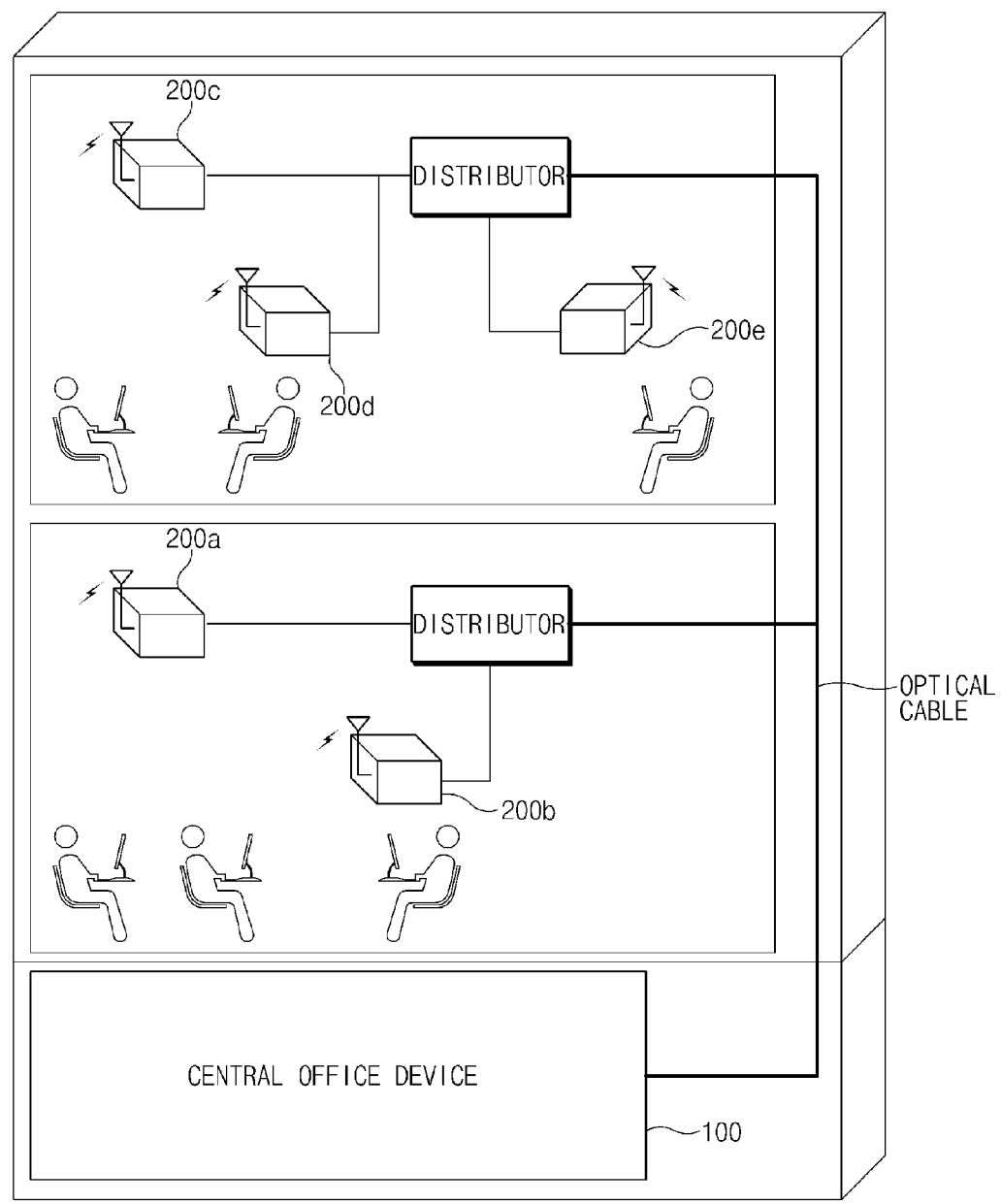
FIG. 1A illustrates an in-building network according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present invention may be variously modified and have several exemplary embodiments. Therefore, specific exemplary embodiments of the present invention will be illustrated in the accompanying drawings and be described in detail in the present specification. However, this is not intended to limit the present invention to the specific exemplary embodiments, and it should be understood that the present invention covers all the modifications, equivalents and replacements included in the spirit and technical scope of the present invention. In describing the present invention, when it is determined that the detailed description of the publicly known art related to the present invention may obscure the gist of the present invention, the detailed description thereof will be omitted.

Terms used in the present application are used only to describe specific exemplary embodiments, and are not intended to limit the present invention. A singular form may include a plural form if there is no clearly opposite meaning in the context. In the present application, it should be understood that the term "include" or "have" indicates that a feature, a number, a component, a part or the combination thereof described in the specification is present, but does not exclude a possibility of presence or addition of one or more other features, numbers, components, parts or combinations thereof, in advance.

Hereinafter, exemplary embodiments of the present invention will be described in detail with reference to the accompanying drawings.

FIG. 1A illustrates an in-building network according to various exemplary embodiments of the present invention.

Referring to FIG. 1A, the in-building network according to various exemplary embodiments of the present invention may include a central office device 100, remote site devices 200a to 200e, an optical cable, and a distributor which may constitute a distributed antenna system (DAS).

The central office (CO) device 100 may be called a central control device or a central unit (CU).

The central office device 100 may receive an input signal from the outside and perform a communication method (signal transmitting method) according to various exemplary embodiments of the present invention. A digital signal generated as a result of the communication method may be transmitted to the distributor provided in each floor of a building illustrated in FIG. 1A through the optical cable.

The remote site (RS) devices 200a to 200e may be called a remote station device or a remote unit (RU).

The remote site devices 200a to 200e may receive the digital signal through the optical cable and the distributor and perform a communication method (signal receiving method) according to various exemplary embodiments of the present invention. A signal having a carrier with a high frequency, which is generated as a result of the communication method, may be transmitted to various user devices that exist in each floor.

Meanwhile, the distributor is provided in each floor in the building illustrated in FIG. 1A, but a plurality of distributor may be provided in one floor. Further, as the distributor, an in-office optical distributor may be used.

Figure 1B:
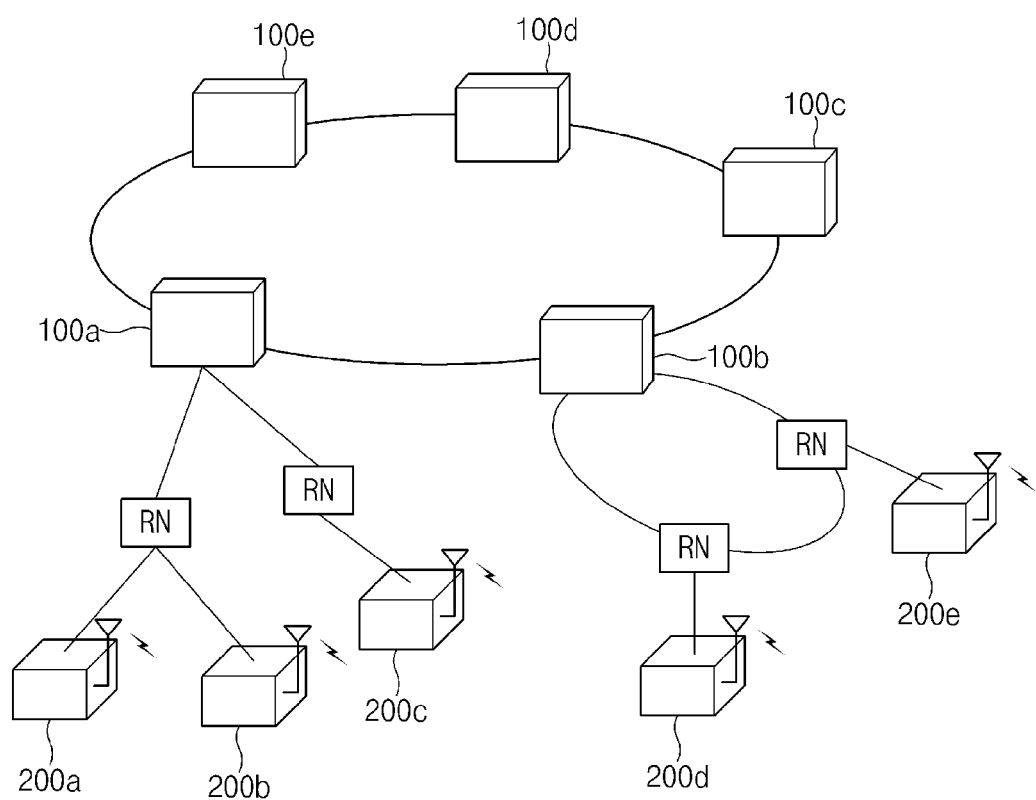
FIG. 1B illustrates a network according to various exemplary embodiments of the present invention.

FIG. 1B illustrates a network according to various exemplary embodiments of the present invention.

Referring to FIG. 1B, the network according to various exemplary embodiments of the present invention may include central office devices 100a to 100e, a remote node (RN), and remote site devices 200a to 200e.

The central office devices 100a to 100e (commonly called 100) are connected to each other through a predetermined channel to form the network. For example, the network as a network connected by the optical cable may be an optical network (e.g., a metropolitan area network (MAN) and a wide area network (WAN)) to which optical wavelength division multiplexing (WDM) is applied.

Various network topologies including the central office device 100 may be applied. For example, the central office device 100*a* may constitute an optical network having a star-tree type topology together with the remote node (RN) and the remote site devices 200*a* to 200*c*. Further, the central office device 100*b* may constitute an optical network having a ring type topology together with the remote node (RN) and the remote site devices 200*d* to 200*e*.

The remote site devices 200*a* to 200*e* (commonly called 200) may receive a signal to be transmitted to a terminal in an area covered by the corresponding remote site device 200 from the central office device 100 through the optical network. That is, the remote site device 200 may transmit the signal received from the central office device 100 to terminals in a coverage range (not illustrated) with a carrier having a predetermined frequency.

FIG. 2 illustrates a central office device and a remote site device according to an exemplary embodiment of the present invention.

Referring to FIG. 2, the central office device 100 and the remote site device 200 according to the exemplary embodiment of the present invention may be connected with each other through a channel 300. The central office device 100 may be installed in the building as illustrated in FIG. 1A or included in a predetermined network topology as illustrated in FIG. 1B, for example.

The central office device 100 may include a signal conversion module 101, a modulation module 103, and a transmission module 105. Although not illustrated, the central office device 100 may further include an appropriate another module for additionally performing a switching function and a routing function.

The signal conversion module 101 may convert (alternatively, generate) an input signal 401 into an analog signal 403 having a carrier with an intermediate frequency (IF). The input signal 401 may be a signal having a baseband frequency, a signal having a carrier with a specific frequency, or a digital signal having various forms. The intermediate frequency (IF) may be a frequency which is higher than the baseband frequency and lower than a carrier frequency (e.g., RF carrier) of a signal transmitted to the air from (an antenna module 207 of) the remote site device 200.

The modulation module 103 applies pulse density modulation (PDM) to the analog signal 403 to generate a digital signal 405 corresponding to the analog signal 403. That is, the modulation module 103 applies the pulse density modulation (PDM) to the signal 403 having the carrier with the intermediate frequency to generate the digital signal 405 having two levels (each corresponds to '0' or '1') as illustrated in FIG. 2. The digital signal 405 may have the intermediate frequency corresponding to the analog signal 403. However, when the modulation module 103 performs the pulse density modulation (PDM), the digital signal 405 may include quantization noise having a frequency higher than the intermediate frequency, and the like.

In applying the pulse density modulation (PDM), a band-pass delta sigma modulation (BPDSM) or low-pass delta sigma modulation (LPDSM) may be applied. For example, as a low-pass delta sigma modulation module, a CMOS low-pass delta sigma modulator may be used. An operation of the modulation module 103 will be described in more detail with reference to FIGS. 3 to 5.

Figure 3:
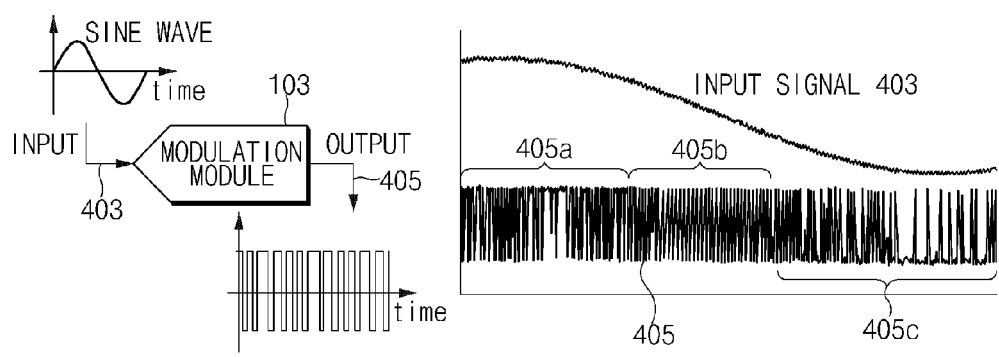
FIG. 3 illustrates that a sine wave signal is modulated by a modulation module according the exemplary embodiment of the present invention.

FIG. 3 illustrates that a sine wave signal is modulated by a modulation module 103 according the exemplary embodiment of the present invention.

Referring to a left block diagram of FIG. 3, the input analog signal 403 configured by a sine wave may be modulated to the digital signal 405 having two levels ('1' or '0') by the modulation module 103. In a right graph of FIG. 3, a graph of a time (horizontal axis) to signal intensity (vertical axis) corresponding to the left block diagram is shown.

Referring to the right graph of FIG. 3, for example, the modulation module 103 may output a digital signal including comparatively many levels '1' as the output signal 405, when the intensity of the signal 403 is large during an interval 405*a* on a time axis. Further, for example, the modulation module 103 may output a digital signal comparatively many levels '0' as the output signal 405, when the intensity of the signal 403 is small during an interval 405*c*. When the intensity of the signal 403 during an interval 405*b* is intermediate, the modulation module 103 may output the digital signal 405 alternatively including the "1" and "0" level signals.

Figure 4:
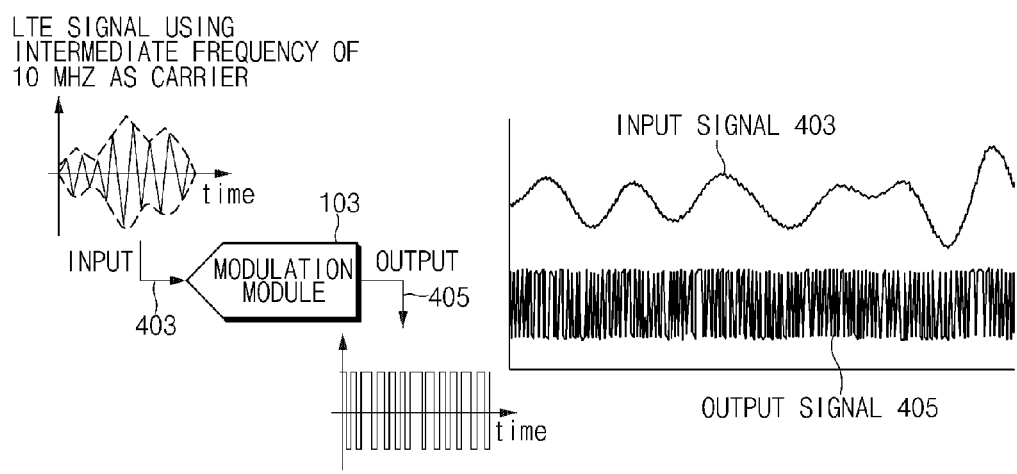
FIG. 4 illustrates that a predetermined LTE signal is modulated by the modulation module according to the exemplary embodiment of the present invention.

FIG. 4 illustrates that a predetermined long-terms evolution (LTE) signal is modulated by the modulation module according to the exemplary embodiment of the present invention.

Referring to a left block diagram of FIG. 4, the predetermined LTE signal 403 having a carrier of 10 MHz (intermediate frequency) may be modulated into the digital signal 405 having two levels by the modulation module 103 similarly to FIG. 3. In a right graph of FIG. 4, a graph of a time (horizontal axis) to signal intensity (vertical axis) corresponding to the left block diagram is shown. The modulation module 103 may modulate the LTE signal 403 into the digital signal including multiple '1' levels when the intensity of the LTE signal 403 is large, while modulating the LTE signal 403 into the digital signal including multiple '0' levels when the intensity of the LTE signal 403 is small.

Figure 5:
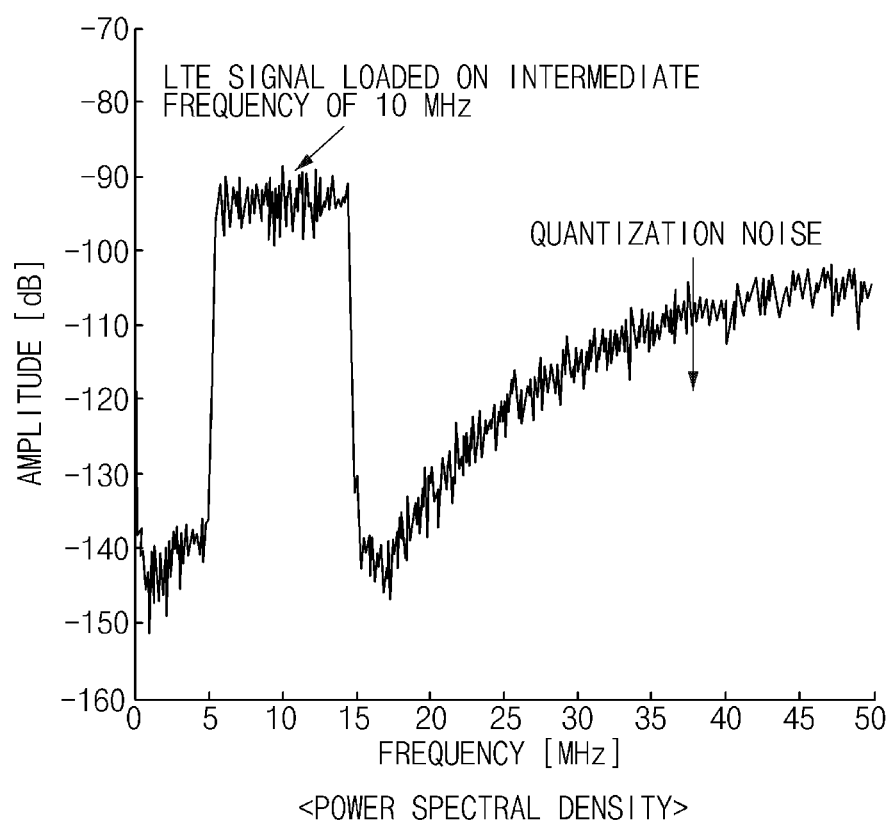
FIG. 5 illustrates a spectrum of a signal output by the modulation module according to the exemplary embodiment of the present invention.

FIG. 5 illustrates a spectrum of a signal output by the modulation module according to the exemplary embodiment of the present invention.

Referring to FIG. 5, a graph (frequency spectrum) of the intensity of a signal depending on a frequency for the output signal 405 of FIG. 4 is shown. A horizontal axis indicates the frequency and a vertical axis indicates the intensity (amplitude) of the signal.

As described above, the modulation module 103 applies the pulse density modulation (e.g., delta sigma modulation) to the signal 403 having the carrier with the intermediate frequency to the signal 403 into the digital signal 405. In this case, the digital signal 405 may include an analog signal having the carrier with the intermediate frequency and the quantization noise. In the case of a graph shown in FIG. 5, a signal having the intermediate frequency is included in a band in approximately 5 to 15 MHz around the intermediate frequency (10 MHz). Contrary to this, the quantization noise generated by the pulse density modulation shows an aspect in which the intensity increases as the frequency increases from approximately 17 MHz. Since the quantization noise is included in the digital signal 405 to be transmitted to the remote site device 200, the remote site device 200 preferably removes the quantization noise (this will be described below).

Referring back to FIG. 2, the transmission module 105 may transmit the digital signal 407 corresponding to the digital signal 405 to the remote site device through the channel 300. The transmission module 105 may be implemented by a module corresponding to the channel 300. For example, when the channel 300 is an optical cable network, the transmission module 105 may include a laser diode LD and when the channel 300 is an atmosphere, the transmission module 105 may include an antenna.

As a result, the central office device 100 frequency-shifts and digitalizes the input signal to the intermediate frequency band to transmit the corresponding signal to the remote site device 200.

The channel 300 may mediate the central office device 100 and the remote site device 200 to transmit and receive the signal. The channel 300 may include the optical cable, a coaxial cable, and the like in the case of wired communication. Meanwhile, the channel 300 may mean the atmosphere in the case of wireless communication. Moreover, the channel 300 may include a network constituted by various transmission paths and the network may extensively include a switching device, a routing device, and the like.

The remote site device 200 may include a receiving module 201, a filter module 203, a frequency conversion module 205, and an antenna module 207.

The receiving module 201 may receive the digital signal 407 from the channel 300. The receiving module 201 may be implemented by a module corresponding to the transmission module 105 of the central office device 100A. The received digital signal may be transmitted to the filter module 203 in an electrical form (signal 409).

The filter module 203 filters the digital signal 409 based on a characteristic of the pulse density modulation method to pass an analog signal 411 having the carrier with the intermediate frequency.

The filter module 203 may remove various noise generated by the modulation module 103, when filtering the signal 409. In particular, the filter module 203 may remove the quantization noise having the frequency higher than the intermediate frequency, and the like. For example, among the signals of the graph shown in FIG. 5, the quantization noise may be cut off by the filter module 203.

Meanwhile, the filter module 203 may use an active filter including an active element and a passive filter not including the active element for achieving low power and low cost. The filter module 203 may use a band-pass filter or a low-pass filter for passing the analog signal 411 having the carrier with the intermediate frequency and interrupting noise other than the analog signal 411. The band-pass filter or low-pass filter preferably has an appropriate threshold value for outputting only the analog signal 411 having the set intermediate frequency and removing various noise.

The frequency conversion module 205 may convert (alternatively, frequency-shift) the frequency of the carrier of the analog signal 411 into a predetermined communication frequency. The frequency conversion module 205 may include, for example, a mixer 211 and a local oscillator (LO) 213.

The frequency conversion module 205 may serve as a frequency up-converter. For example, the local oscillator 213 may provide a frequency corresponding to a value acquired by subtracting the intermediate frequency (IF) from a communication frequency of the signal 413 transmitted from the antenna 207. The frequency signal provided by the local oscillator 213 may be mixed with the analog signal 411 having the carrier with the intermediate frequency (IF) by the mixer 211. Therefore, the mixed signal 413 may have a carrier (corresponding to the high-frequency carrier illustrated in FIG. 2) having a predetermined communication frequency.

The communication frequency of the signal 413 transmitted from the antenna module 207 may be a frequency predetermined between the antenna module 207 and a terminal receiving the analog signal 413. For example, when the exemplary embodiment of the present invention is applied to a 4G LTE system, the frequency may be at least one of approximately 900 MHz, 1.8 GHz, 2.1 GHz, and 2.6 GHz.

The antenna module 207 may transmit the converted analog signal 413. For example, the antenna module 207 may wirelessly transmit the signal 413 to terminals such as a cellular phone, a smart phone, a tablet PC, and the like.

FIG. 6A illustrates the central office device and the remote site device according to the exemplary embodiment of the present invention.

Referring to FIG. 6A, first and second input signals may be inputted into central office devices 100A and 100B, respectively. Configurations of the central office devices 100A and 100B may correspond to a configuration of the central office device 100 of FIG. 2 and configurations of remote site devices 200A and 200B may correspond to a configuration of the remote site device 200 of FIG. 2. The corresponding configurations will not be described in detail.

In a 4G LTE mobile communication system, a multicarrier technique and carrier aggregation using a plurality of frequency bands distributed in 900 MHz, 1.8 GHz, 2.1 GHz, and the like may be supported. That is, in the 4G LTE mobile communication system, a plurality of signals may be simultaneously transmitted and received by using different frequency bands.

When the exemplary embodiment of the present invention is applied to the 4G LTE mobile communication system, the first input signal and the second input signal having the baseband frequency may be inputted into the central office devices 100A and 100B, respectively, for example. The first and second input signals may be converted into signals having carriers with a first intermediate frequency and a second intermediate frequency which are different from each other and thereafter, transmitted to the remote site devices 200A and 200B in the digital signal form, respectively.

In the remote site device 200A, a filter module 203A filters the digital signal to pass a (first) analog signal having the carrier with the first intermediate frequency. A frequency conversion module 205A may up-convert the carrier frequency of the (first) analog signal having the carrier with the first intermediate frequency to 900 MHz. An antenna module 207A may wirelessly transmit the first analog signal up-converted to 900 MHz to a terminal in coverage.

Similarly, in the remote site device 200B, a filter module 203B filters the digital signal to pass a (second) analog signal having the carrier with the second intermediate frequency. A frequency conversion module 205B may up-convert the carrier frequency of the (second) analog signal having the carrier with the first intermediate frequency to 1.8 GHz. An antenna module 207B may wirelessly transmit the second analog signal up-converted to 1.8 GHz to the terminal in the coverage.

Figure 6B:
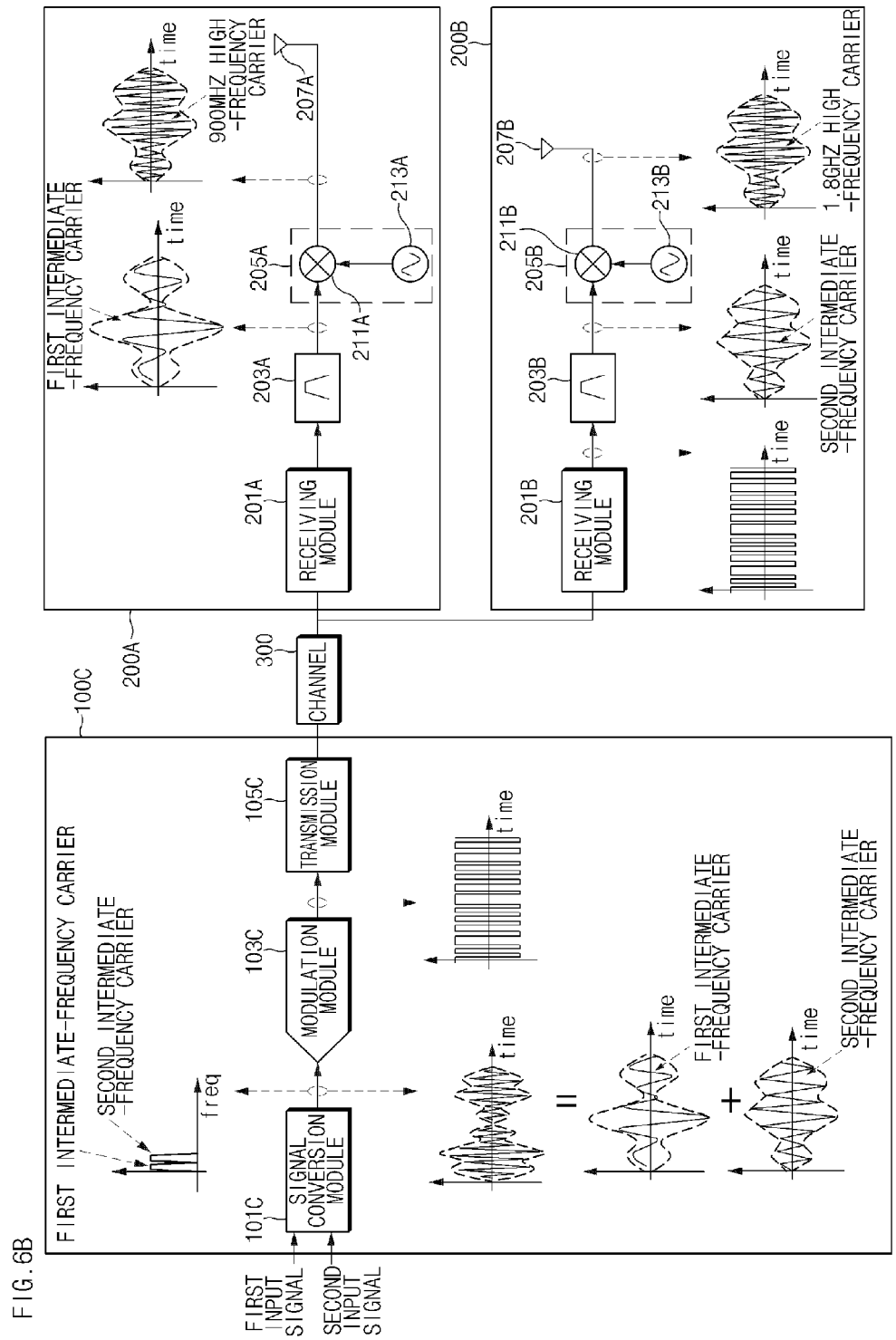
FIG. 6B illustrates a central office device and a remote site device when a plurality of signal is input according to another exemplary embodiment of the present invention.

FIG. 6B illustrates a central office device and a remote site device when a plurality of signals is inputted according to another exemplary embodiment of the present invention.

Referring to FIG. 6B, each of the first and second input signals may be inputted into a central office device 100C. A partial configuration of the central office device 100C may correspond to a partial configuration of the central office device 100 of FIG. 1(2) and the configurations of the remote site devices 200A and 200B are the same described above.

When another exemplary embodiment of the present invention is applied to the 4G LTE mobile communication system, the first input signal and the second input signal may be inputted into a signal conversion module 101C of the central office device 100C. The signal conversion module 101C may convert the first input signal and the second input signal into the analog signals having the carrier with the first intermediate frequency and the carrier with the second intermediate frequency, respectively. The signal conversion module 101C may synthesize the (first) analog signal having the carrier with the first intermediate frequency and the (second) analog signal having the carrier with the second intermediate frequency and transfer the synthesized analog signals to the modulation module 103C.

Meanwhile, the first and second intermediate frequencies are preferably higher than the baseband frequency and lower than a lowest frequency among communication frequencies of the signals transmitted from the remote site devices 200A and 200B and more preferably set to not overlap with each other.

The synthesized analog signals may be modulated into the digital signals by the modulation module 103C based on the pulse density modulation and thereafter, transmitted to the remote site devices 200A and 200B through the channel 300. In the remote site devices 200A and 200B, each of the filter modules 203A and 203B may filter the digital signals.

The filter module 203A may pass the (first) analog signal having the carrier with the first intermediate frequency. Further, the filter module 203B may pass the (second) analog signal having the carrier with the second intermediate frequency.

The frequency conversion module 205A may up-convert the carrier frequency of the (first) analog signal having the carrier with the first intermediate frequency to 900 MHz. The antenna module 207A may wirelessly transmit the first analog signal up-converted to 900 MHz to the terminal in the coverage. Similarly, the frequency conversion module 205B may up-convert the carrier frequency of the second analog signal having the carrier with the second intermediate frequency to 1.8 GHz. The antenna module 207B may wirelessly transmit the second analog signal up-converted to 1.8 GHz to the terminal in the coverage.

In the exemplary embodiment illustrated in FIG. 6B, a case in which two input signals are provided, but the number of input signals may be N (N is an integer of 2 or more). When the number of input signals is N or more, N intermediate frequencies corresponding to the respective input signals may be set and the filter modules of the corresponding remote site devices may also be N.

However, even in this case, N respective intermediate frequencies are preferably higher than the baseband frequency and lower than a lowest frequency among the carrier frequencies of the signals transmitted from the remote site devices. Further, the respective intermediate frequencies are more preferably set so that the respective intermediate frequencies have no intervals to overlap with each other.

Figure 6C:
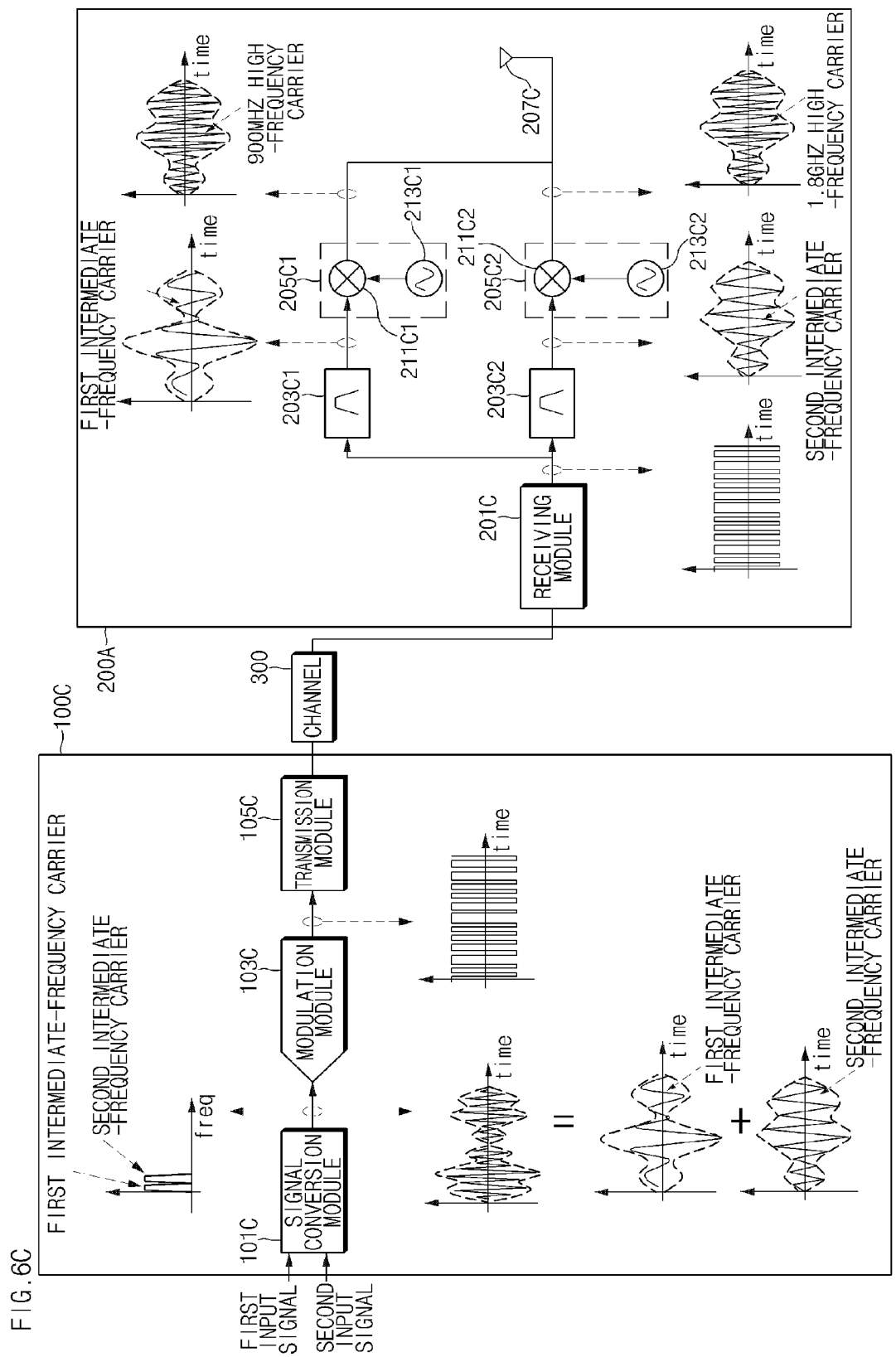
FIG. 6C illustrates a central office device and a remote site device when a plurality of signals is input according to yet another exemplary embodiment of the present invention.

FIG. 6C illustrates a central office device and a remote site device when a plurality of signal is inputted according to yet another exemplary embodiment of the present invention.

Referring to FIG. 6C, each of the first and second input signals may be inputted into a central office device 100C. The configuration of the central office device 100C is described above and since the configuration of the remote site device 200C may correspond to a partial configuration of the remote site device 200 of FIG. 2, the corresponding partial configuration will be not described in detail.

The central office device 100C converts the first and second input signals into the first and second analog signals having the carrier with the first and second intermediate frequencies and synthesizes the converted first and second analog signals. The central office device 100C may convert the synthesized analog signal into the digital signal and thereafter, transmit the converted digital signal to the remote site device 200C through the channel 300.

In the remote site device 200C, the receiving module 201C may transfer the digital signal to filter modules 203C1 and 203C2.

The filter module 203C1 may pass the first analog signal having the carrier with the first intermediate frequency by filtering the digital signal. The frequency conversion module 205C1 may up-covert the carrier frequency of the first analog signal to, for example, 900 MHz.

Similarly, the filter module 203C2 deployed in parallel to the filter module 203C1 may pass the second analog signal having the carrier with the second intermediate frequency by filtering the digital signal. The frequency conversion module 205C2 may up-convert the carrier frequency of the second analog signal to, for example, 1.8 GHz.

The antenna module 207C may wirelessly transmit the first analog signal up-converted to 900 MHz and the second analog signal up-converted to 1.8 GHz to the terminal in the coverage.

Similarly to FIG. 6B, in the exemplary embodiment illustrated in FIG. 6C, the case in which two input signals are provided, but the number of input signals may be N (N is the integer of 2 or more). When the number of input signals is N, N intermediate frequencies corresponding to the respective input signals may be set and the filter modules of the corresponding remote site devices may also be N.

A system of a form in which FIGS. 6B and 6C are mixed may also be assumed. For example, a system may be assumed, in which the central office device receiving six signals, the first remote site device including three filter modules, the second remote site device including two filter modules, and the third remote site device including one filter module are connected to each other through the channel.

Figure 7:
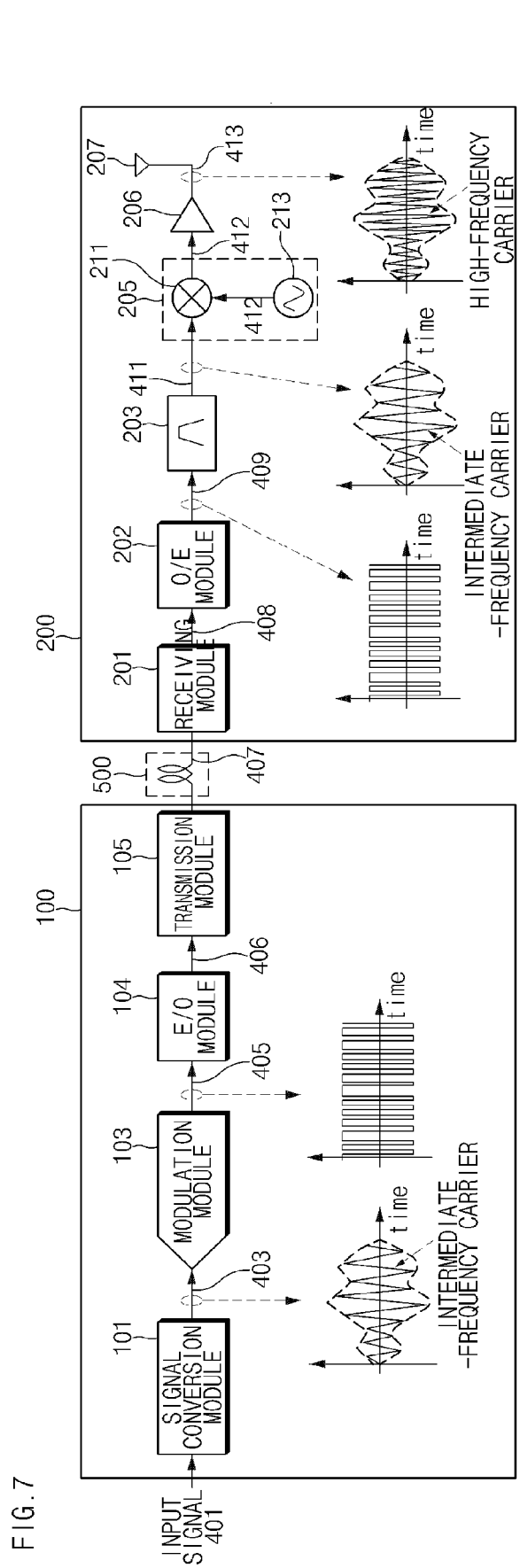
FIG. 7 illustrates a central office device and a remote site device according to another exemplary embodiment of the present invention.

FIG. 7 illustrates a central office device and a remote site device according to another exemplary embodiment of the present invention.

Referring to FIG. 7, the central office device 100 and the remote site device 200 applied to the RoF technique and the optical cable network 500 as the channel are illustrated. The central office device 100 may include a signal conversion module 101, a modulation module 103, an electrical to optical conversion module (E/O module) 104, and a transmission module 105. Further, the remote site device 200 may include a receiving module 201, an optical to electrical conversion (O/E) module 202, a filter module 203, a frequency conversion module 205, a power amplifier module 206, and an antenna module 207.

The signal conversion module 101, the modulation module 103, and the transmission module 105 of the central office device 100 and the receiving module 201, the filter module 203, the frequency conversion module 205, and the antenna module 207 of the remote site device 200 correspond to the components illustrated in FIG. 2.

The E/O module 104 may convert the digital signal 405 into an optical digital signal 406 having the same frequency as the digital signal 405 and transfer the optical digital signal 406 to the transmission module. When the E/O module 104 is used, the transmission module 105 may transmit the optical digital signal 407 corresponding to the optical digital signal 406 to the remote site device 200B through the optical cable network 500 by using the laser diode (LD), for example.

The receiving module 201 may receive the optical digital signal 407 having the intermediate frequency from the optical cable network 500 as the channel. The receiving module 201 may include a photo detector (PD) for detecting the optical digital signal 407 and an interface. The receiving module 201 may transfer an optical digital signal 408 corresponding to the received optical digital signal 407 to the O/E module 202.

The O/E module 202 may convert the optical digital signal 408 into an electrical digital signal 409. In detail, the O/E module 202 may include a transimpedance amplifier (TIA) that converts optical current into an electrical signal.

The power amplifier module 206 may amplify power of an analog signal 412 and transfer the amplified power to the antenna module 207. That is, the power amplifier module 206 may amplify the power of the analog signal 412 so that the signal transmitted from the antenna module 207 reaches the terminal with sufficient power. The antenna module 207 may transmit an analog signal 413 with the amplified power to a service terminal.

Meanwhile, the optical cable network 500 as the channel may be a concept including the optical network including the optical cable and various communication equipment accompanied thereby and is not just limited to the physical optical cable.

The configurations and the functions of the central office device 100 and the remote site device 200 according to various exemplary embodiments of the present invention are described above. Hereinafter, a communication method of the central office device 100 and the remote site device 200 according to various exemplary embodiments of the present invention will be described with reference to FIGS. 7 to 10.

Figure 8:
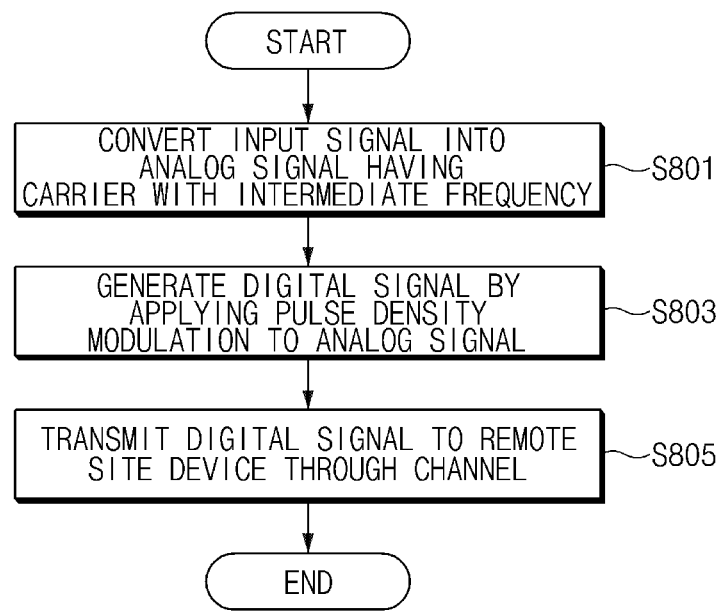
FIG. 8 illustrates a communication method of a central office device according to an exemplary embodiment of the present invention.

FIG. 8 illustrates a communication method of a central office device according to an exemplary embodiment of the present invention.

Referring to FIG. 8, the communication method of the central office device 100 according to the exemplary embodiment of the present invention may include an operation (S801) of converting an input signal into an analog signal having a carrier with an intermediate frequency (IF), an operation (S803) of generating a digital signal corresponding to the analog signal by applying pulse density modulation (PDM), and an operation (S805) of transmitting the digital signal to a remote site device through a channel.

In operation S801, the signal conversion module 101 may convert the input signal into the analog signal having the carrier with the intermediate frequency (IF). In this case, the intermediate frequency may be higher than a baseband frequency and lower than a frequency having a carrier of a signal transmitted from (the antenna module 207) of the remote site device 200. Further, the input signal may have the baseband frequency. According to the exemplary embodiment, the input signal may exist in plural.

In operation S803, the modulation module 103 applies the pulse density modulation (PDM) to the analog signal to generate the digital signal corresponding to the analog signal. As the pulse density modulation (PDM), band-pass delta sigma modulation (BPDSM) or low-pass delta sigma modulation (LPDSM) may be used.

In operation S805, the transmission module 105 may transmit the digital signal to at least one remote site device through the channel.

Figure 9:
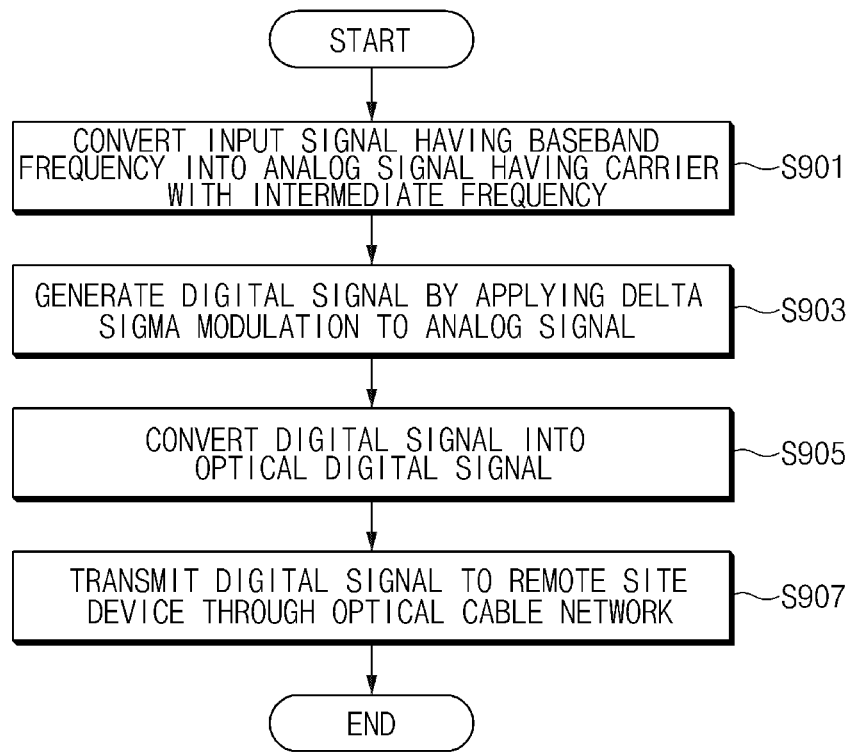
FIG. 9 illustrates a communication method of a central office device according to another exemplary embodiment of the present invention.

FIG. 9 illustrates a communication method of a central office device according to another exemplary embodiment of the present invention.

Referring to FIG. 9, the communication method of the central office device 100 under an optical communication environment may include operations 5901 to 5907.

In operation 5901, the signal conversion module 101 may convert the input signal having the baseband frequency into the analog signal having the carrier with the intermediate frequency. In operation 5902, the modulation module 103 applies the delta sigma modulation to the analog signal to generate the digital signal corresponding to the analog signal. In operation 5905, the E/O module 104 may convert the digital signal into an optical digital signal corresponding to the digital signal. Subsequently, in operation 5907, the transmission module 105 may transmit the optical digital signal to the remote site device 200 through an optical cable network.

Figure 10:
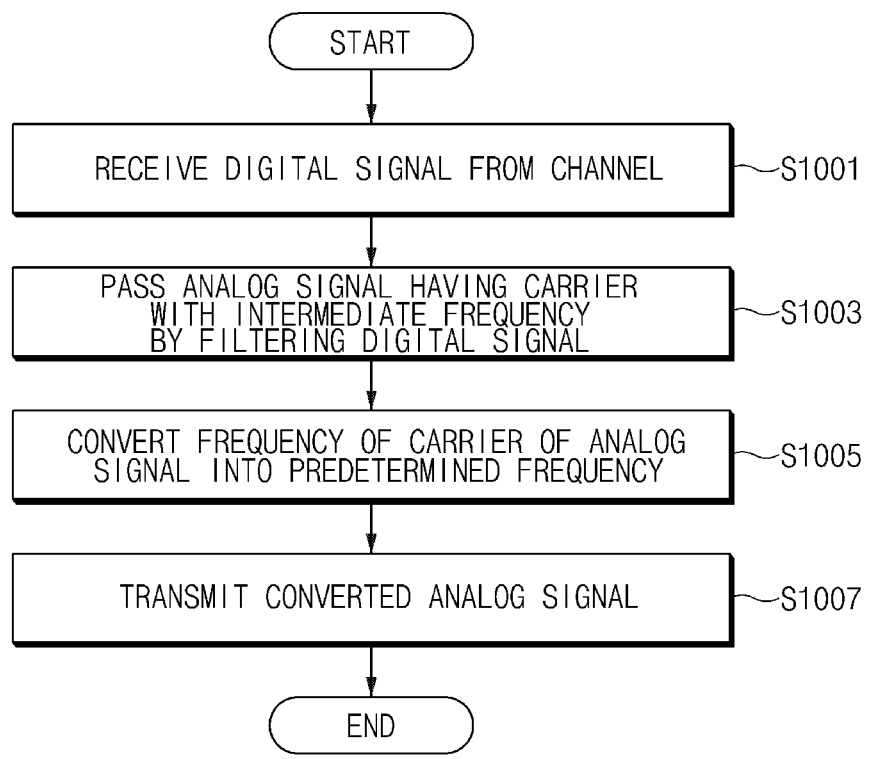
FIG. 10 illustrates a communication method of a remote site device according to an exemplary embodiment of the present invention.

FIG. 10 illustrates a communication method of a remote site device according to an exemplary embodiment of the present invention.

Each operation illustrated in FIG. 10 may be performed subsequently to each operation illustrated in FIG. 8. The communication method of the remote site device 200 according to the exemplary embodiment of the present invention may include an operation (S1001) of receiving the digital signal from the channel 300, an operation (S1003) of passing the analog signal having the carrier with the intermediate frequency by filtering the digital signal, an operation (S1005) of converting the frequency of the carrier of the analog signal into a predetermined communication frequency, and an operation (S1007) of transmitting the converted analog signal.

In operation S1001, the receiving module 201 may receive the digital signal from the channel 300. The digital signal may include quantization noise as well as the digital signal having the intermediate frequency.

In operation S1003, the filtering module 203 may pass the analog signal having the carrier with the intermediate frequency by filtering the digital signal. The intermediate frequency is preferably higher than the baseband frequency and lower than the predetermined communication frequency. According to the exemplary embodiment, the filter module 203 may exist in plural and the plurality of filter modules may operate operation S1003.

In operation S1003, the quantization noise received together with the digital signal from the receiving module may be removed. Further, since the quantization noise generally has a frequency higher than the intermediate frequency, operation S1003 may be performed by a band-pass filter or a low-pass filter that can remove the quantization noise while passing the intermediate frequency band. Moreover, operation S1003 may be performed by a passive filter not including an active element.

In operation S1005, the frequency conversion module 205 may convert the frequency of the carrier of the analog signal passed in operation S1003 into a predetermined communication frequency. The predetermined communication frequency may be a predetermined frequency between the antenna module 207 and a terminal receiving a signal. For example, the predetermined frequency may be a frequency on an LTE technique standard such as approximately 900 MHz, 1.8 GHz, 2.1 GHz, 2.6 GHz, or the like.

In operation S1007, the antenna module 207 may transmit the converted analog signal.

Figure 11:
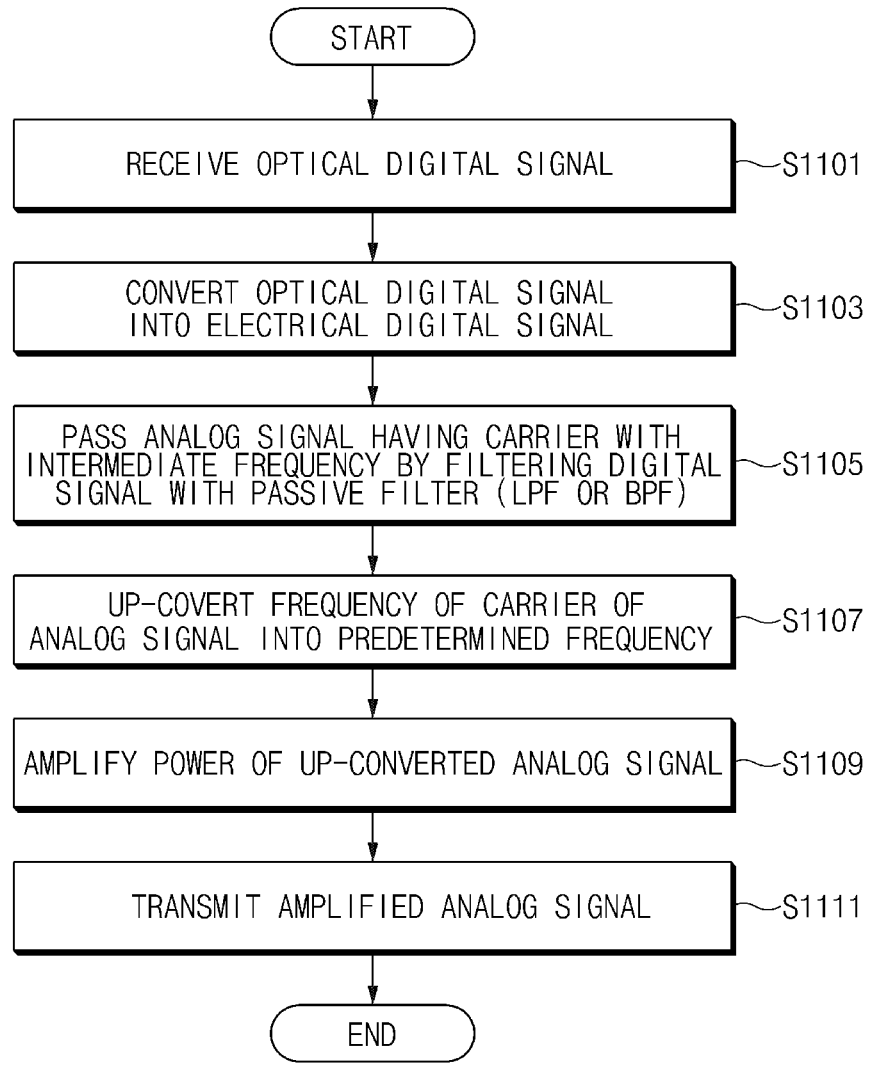
FIG. 11 illustrates a communication method of a remote site device according to another exemplary embodiment of the present invention.

FIG. 11 illustrates a communication method of a remote site device according to another exemplary embodiment of the present invention.

Referring to FIG. 11, under an optical communication environment, the communication method of the remote site device 200 according to another exemplary embodiment of the present invention may include operations S1101 to S1111. The operations illustrated in FIG. 10 may be performed subsequently to each operation illustrated in FIG. 9, for example.

In operation S1101, the receiving module 201 may receive the optical digital signal from the channel (in particular, the optical cable network) by using, for example, the photo detector and the interface included in the receiving module 201. In operation S1103, the O/E module 202 may convert the optical digital signal into an electrical digital signal by using a transimpedance amplifier included in the O/E module 202, for example. In operation S1105, the filter module 203 may pass the analog signal having the carrier with the intermediate frequency by filtering the digital signal with the passive filter (low-pass filter or band-pass filter). In operation S1107, the frequency conversion module 205 may up-covert the frequency of the carrier of the analog signal into a predetermined frequency. In operation S1109, the power amplifier module 206 may amplify power of the up-converted analog signal. In operation S1111, the antenna module 207 may transmit the amplified analog signal.

According to the central office device, the remote site device, and the communication method thoseof according to various exemplary embodiments of the present invention, the following effects can be at least achieved.

According to various exemplary embodiments of the present invention, since the signal transmitted to the remote site device through the channel has an analog signal form but a digital signal form, more stable performance can be achieved against a change in surrounding environment. Further, due to a characteristic of the digital signal, as long as the signal intensity of the digital signal input into the receiving module 201 does not decrease to a specific level or less, it is advantageous that predetermined transmission signal quality can be maintained.

According to various exemplary embodiments of the present invention, the intermediate frequency (IF) is higher than the baseband frequency and lower than the carrier frequency of the signal transmitted from the remote site device. Moreover, modulation of the signal, electrical to optical or optical to electrical conversion of the signal, transmission of the signal, and the like are performed based on the intermediate frequency. Accordingly, lower power and low cost can be achieved than the case in which the modulation, the conversion, and the transmission are performed based on the carrier frequency of the signal transmitted from the remote site device having a frequency of several GHzs.

In the central office device, the modulation module can use the pulse density modulation (in particular, delta sigma modulation) in which the density of the pulse having a predetermined minimum width is changed according to the magnitude of the input signal in modulating the analog signal into the digital signal. As a result, the modulation module may be applied through easy joining with the transmitting module and the receiving module in which a transmission speed has already been fixed. Further, since a pulse density modulation (in particular, delta sigma modulation) module is used as the modulation module, it is advantageous that a general analog/digital converter (ADC) may not be used.

According to various exemplary embodiments of the present invention, in the remote site device, since the passive filter may be used as the filter module, low power may be achieved. Besides since the low-pass filter or band-pass filter having a simple structure may be used as the filter module, it is advantageous that the general digital/analog converter (DAC) may not be used.

According to various exemplary embodiments of the present invention, since the central office device and the remote site device may process a plurality of input signals, the central office device and the remote site device may properly cope with the 4G LTE mobile communication system using a plurality of frequency bands. Furthermore, according to the exemplary embodiment, since the system may be constructed only by one central office device and one remote site device, required cost may be reduced.

Meanwhile, the aforementioned method of the present invention can be prepared by a computer program. In addition, codes and code segments constituting the program can be easily deduced by a computer programmer skilled in the art. Further, the prepared program is stored in a computer readable recording medium (information storage medium) and is read and executed by a computer to implement the method of the present invention. In addition, the recording medium includes all types of computer readable recording media.

Specific executions described in the present invention as exemplary embodiments do not limit the scope of the present invention by any method. For simplification of the specification, circuit components control systems, software, and other functional aspects of the systems in the related art may not be described. Further, connections of lines or connection members among components illustrated in the drawings exemplarily show functional connections and/or physical or circuit connections and may be expressed as replaceable or additional various function connections, physical connection, or circuit connections in actual devices. In addition, if not mentioned in detail like "requisitely", "importantly", and the like, the corresponding component may not be a component particularly required for applying the present invention.

In the specification (in particular, claims) of the present invention, a term of "the' and indication terms similar thereto may be used in both the singular number and the plural number. Further, when "range" is disclosed, the present invention in which individual values included in the range is included (if there is no disclosure contrary thereto), it is the same as the respective individual values constituting the range being disclosed in the detailed description of the present invention. All examples or exemplary terms (e.g., etc.) in the present invention are just used for, in detail, describing the present invention and if the examples or exemplary terms are not limited by the claims, the range of the present invention is not limited by the examples or exemplary terms. Further, it can be appreciated by those skilled in the art that various modifications, combinations, and changes may be configured according to a design condition and a design factor within the appended claims or a category equivalent thereto.

Since those skilled in the art can make various substitutions, modifications, and changes within the scope without departing from the technical spirit of the present invention, the present invention described as above is not limited by the aforementioned exemplary embodiments and the accompanying drawings.

What is claimed is:

1. A central office device comprising:
   a signal conversion module converting an input signal into an analog signal having a carrier with an intermediate frequency (IF);
   a modulation module generating a digital signal corresponding to the analog signal by applying pulse density modulation to the analog signal; and
   a transmission module transmitting the digital signal to a remote site device through a channel,
   wherein the signal conversion module converts a first input signal and a second input signal into analog signals having a carrier with a first intermediate frequency and a carrier with a second intermediate frequency, respectively and synthesizes the analog signals, and the modulation module applies pulse density modulation to the synthesized analog signal to generate a digital signal corresponding to the synthesized analog signal.

2. The device of claim 1, wherein the modulation module applies band-pass delta sigma modulation (BPDSM) to the analog signal to generate the digital signal.

3. The device of claim 1, wherein the modulation module applies low-pass delta sigma modulation (LPDSM) to the analog signal to generate the digital signal.

4. The device of claim 1, wherein the intermediate frequency is higher than a baseband frequency and lower than a carrier frequency of a signal transmitted from the remote site device.

5. The device of claim 1, wherein the input signal is a signal having the baseband frequency.

6. The device of claim 1, further comprising:
an electrical to optical conversion module converting the digital signal into an optical digital signal,
wherein the transmission module transmits the optical digital signal to the remote site device.

7. A remote site device comprising:
a receiving module receiving a digital signal from a channel;
a filter module passing an analog signal having a carrier with an intermediate frequency by filtering the digital signal;
a frequency conversion module converting the frequency of the carrier of the analog signal into a predetermined communication frequency; and
an antenna module transmitting the converted analog signal,
wherein the filter module includes:
a first filter module passing a first analog signal having a carrier with a first intermediate frequency by filtering the digital signal, and
a second filter module passing a second analog signal having a carrier with a second intermediate frequency by filtering the digital signal.

8. The device of claim 7, wherein the filter module is a passive filter.

9. The device of claim 7, wherein the filter module is a low-pass filter or a band-pass filter.

10. The device of claim 7, wherein the intermediate frequency is higher than a baseband frequency and lower than the predetermined communication frequency.

11. The device of claim 7, further comprising:
wherein the digital signal received from the channel is an optical digital signal,
an optical/electrical conversion module converting the optical digital signal into an electrical digital signal.

12. The device of claim 7, wherein the predetermined communication frequency is a predetermined frequency between the antenna module and a terminal receiving the converted analog signal.

13. The device of claim 7, wherein the frequency conversion module includes:
a first frequency conversion module converting the frequency of the carrier of the first analog signal into a first communication frequency; and
a second frequency conversion module converting the frequency of the carrier of the second analog signal into a second communication frequency.

14. A communication method comprising:
converting an input signal into an analog signal having a carrier with an intermediate frequency (IF);
generating a digital signal corresponding to the analog signal by applying pulse density modulation to the analog signal; and
transmitting the digital signal to a remote site device through a channel,
wherein in the converting the input signal, a first input signal and a second input signal are converted into analog signals having a carrier with a first intermediate frequency and a carrier with a second intermediate frequency, respectively and the analog signals are synthesized, and
in the generating the digital signal, pulse density modulation is applied to the synthesized analog signal to generate a digital signal corresponding to the synthesized analog signal.

15. The method of claim 14, wherein in the generating of the digital signal, band-pass delta sigma modulation (BPDSM) or low-pass delta sigma modulation (LPDSM) is applied to the analog signal to generate the digital signal.

16. The method of claim 14, wherein the intermediate frequency is higher than a baseband frequency and lower than a carrier frequency of a signal transmitted from the remote site device.

17. The method of claim 14, wherein the input signal is a signal having the baseband frequency.

18. The method of claim 14, further comprising:
converting the digital signal into an optical digital signal,
wherein in the transmitting, the optical digital signal is transmitted to the remote site device.

* * * * *